(12) United States Patent
Franck et al.

(10) Patent No.: US 7,286,767 B2
(45) Date of Patent: Oct. 23, 2007

(54) OPTICAL TRANSCEIVER OVER SINGLE COMMUNICATION LINK

(75) Inventors: Thorkild Franck, Gentofte (DK); Eivind Johansen, Ålsgårde (DK); Benny Christensen, Frederikssund (DK); Martin Lobel, Snekkersten (DK)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 10/674,649

(22) Filed: Sep. 30, 2003

(65) Prior Publication Data

US 2005/0069327 A1 Mar. 31, 2005

(51) Int. Cl.
*H04B 10/00* (2006.01)

(52) U.S. Cl. .................. 398/135; 398/141; 398/41; 398/42; 398/138; 398/139; 398/136; 398/137; 398/128; 398/130; 398/133; 398/182; 398/183; 398/202; 398/208; 398/214; 398/207; 398/158; 398/159; 398/163; 398/164; 398/161; 385/88; 385/89; 385/92; 385/93

(58) Field of Classification Search .............. 398/41, 398/42, 79, 135, 13, 139, 128, 130, 182, 398/133, 202, 134, 141, 155, 152, 164, 159, 398/163, 138, 208, 78, 183, 136, 137, 158, 398/161, 214, 207; 385/88, 89, 92, 93
See application file for complete search history.

(56) References Cited

U.S. PATENT DOCUMENTS

| 5,255,111 | A | * | 10/1993 | Kwa ......................... 398/138 |
|---|---|---|---|---|
| 5,349,462 | A | | 9/1994 | Defranco et al. |
| 5,631,757 | A | * | 5/1997 | Bodeep et al. ............... 398/138 |
| 5,712,864 | A | * | 1/1998 | Goldstein et al. ......... 372/50.21 |
| 6,535,308 | B1 | * | 3/2003 | BuAbbud et al. ............. 398/41 |
| 6,731,881 | B2 | * | 5/2004 | Nomura ...................... 398/135 |
| 7,072,587 | B2 | * | 7/2006 | Dietz et al. ................. 398/138 |
| 2003/0039010 | A1 | * | 2/2003 | Akimoto et al. ............. 359/152 |
| 2004/0264973 | A1 | * | 12/2004 | Bremner et al. ............. 398/140 |

FOREIGN PATENT DOCUMENTS

CN 2427935 Y 4/2001

OTHER PUBLICATIONS

Ben-Michael, R. et al., "A Bi-Directional Transceiver PIC for Ping-Pong Local Loop Configurations Operating at 1.3-μm Wavelength", IEEE Photonics Technology Letters, Dec. 1995, pp. 1424-1426, vol. 7, No. 12.

Mallecot, F. et al., "-31 dBm Sensitivity of a Monolithic Transmit-Receive-Device Over Wide Temperature Range", Alcatel Optronics, Villarceaux, Route de Villejust, F-91625 Nozay Cedex, France, pp. 191-194, Feb. 1999.

(Continued)

*Primary Examiner*—Hanh Phan
(74) *Attorney, Agent, or Firm*—Blakely, Sokoloff, Taylor & Zafman LLP (57) ABSTRACT

A method, apparatus, and system for optical communications. An optical transmit signal is generated in response to an electrical transmit signal. The optical transmit signal is coupled into a single communication link for transmission there over. An optical receive signal is received from the single communication link, and in response an electrical receive signal is generated.

34 Claims, 7 Drawing Sheets

OTHER PUBLICATIONS

Uno, Tomoaki, "1.3/1.55μm WDM Transceiver Modules for 155Mbps Application", IEEE, 2001, pp. 111-112.
www.as400-shop.com/nbase-xyplex/single_fiber_full_duplex.htm, "Single Fiber Full Duplex", Sep. 30, 2003.
Honeywell, "Infrared Products, Single Fiber Duplex Modules", Honeywell Control Products, Freeport IL, pp. 1-6, Sep. 12, 2002.
"FTTx: Fiber to the X", Luminent, Chatsworth CA, Mar. 2002.
NEC, www.necus.com/media/press_releases/template.cfm?DID=1719, "NEC Fiberoptech and Wavesplitter to Display Wide Range of New NEC Transponder Products at OFC", Sep. 30, 2003.
"1.25Gbps Single Fiber Bi-Directional Optical Module", Appointech Inc., Jul. 2, 2002, pp. 1-3.
Silica, www.silica.com/special_offer/inf-20020110silicaw.html, Infineon's Bi-Directional Module (BIDI), Sep. 30, 2003.
Infineon Technologies AG, www.infineon.com/news/press/203_062e.htm, Sep. 30, 2003.
Murphy, Tom, "A PMD for P2P Links: Single or Dual Wavelength?", IEEE 802.3ah, Edinburgh, May 2002, pp. 1-11.
Patton Electronics Co., www.patton.com/cgi-patton/catalog-bin/pressprint.cgi?related=2000:11:13:10:20:07, "Single Fiber Modems Extend E1/G.703 Connections", Sep. 30, 2003.

* cited by examiner

OPTICAL TRANSCEIVER OVER SINGLE COMMUNICATION LINK

TECHNICAL FIELD

This disclosure relates generally to optical communication systems, and in particular, but not exclusively, relates to electro-optical transceivers.

BACKGROUND INFORMATION

Modern communication tools and applications are demanding higher and higher bandwidths to support increasing data throughputs. A popular solution to support the data throughput demands are optical communication networks. Optical communication networks are capable of supporting data bit-rates on the order of Gbits/s using a single optical fiber.

Figure 1:
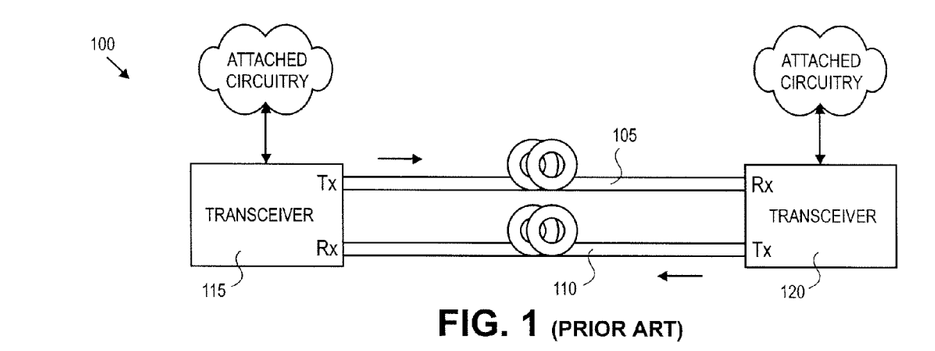
FIG. 1 is a block diagram illustrating a known two-fiber optical communication system.

However, most modern communication tools and applications require bi-directional communications. Thus, optical communication networks must be capable of supporting bi-directional communications. FIG. 1 is a block diagram illustrating a known bi-directional optical communication system 100. Optical communication system 100 is a two-fiber solution. Optical communication system 100 addresses the bi-directional problem by providing two unidirectional optical fibers 105 and 110. An optical transceiver 115 transmits data for reception by an optical transceiver 120 using optical fiber 105. Optical transceiver 120 transmits data for reception by optical transceiver 115 using optical fiber 110. Thus, a closed communication loop is established for bi-directional communication using two optical fibers. However, the two-fiber solution requires laying/routing two physical optical fibers between the two communication nodes. Furthermore, it requires redundant optics and electronics in each of optical transceivers 115 and 120 for coupling to two separate optical fibers. Thus, the two-fiber solution achieves bi-directional communications at an increased cost, both in terms of an initial infrastructure investment and maintenance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for optical communications across a single communication link (e.g., optical fiber) are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
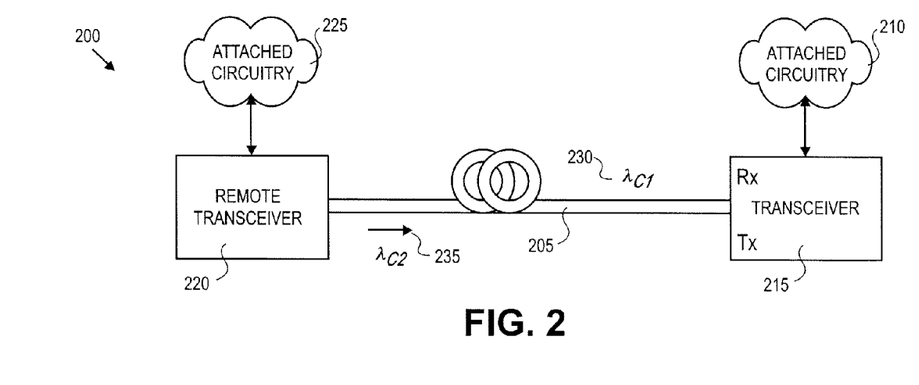
FIG. 2 is a block diagram illustrating a communication system for implementing bi-directional communications over a single communication link, in accordance with an embodiment of the present invention.

FIG. 2 is a block diagram illustrating a communication system 200 for implementing bi-directional communications over a single communication link 205, in accordance with an embodiment of the present invention. The illustrated embodiment of communication system 200 includes attached circuitry 210, a transceiver 215, communication link 205, a remote transceiver 220, and attached circuitry 225.

The elements of communication system 200 are connected as follows. Attached circuitry 210 is electrically coupled to transceiver 215 to send and to receive data thereto/therefrom. Attached circuitry 210 may include a network, a computer, an application specific integrated circuit ("ASIC") and/or the like. Transceiver 215 is optically coupled to communication link 205. Data received by transceiver 215 from attached circuitry 210 is modulated onto an electrical transmit signal, which is then converted into an optical transmit signal 230 having a communication wavelength $\lambda_{C1}$ and launched/coupled into communication link 205 for transmission to remote transceiver 220 and ultimately attached circuitry 225. Transceiver 215 is further coupled to communication link 205 to receive an optical receive signal 235 having a communication wavelength $\lambda_{C2}$ sent from remote transceiver 220. Optical receive signal 235 is coupled into transceiver 215 and converted into an electrical receive signal. Data modulated onto the electrical receive signal is extracted by transceiver 215 and provided to attached circuitry 210.

For the purposes of clarity and ease of discussion, signals propagating along communication link 205 between transceiver 215 and remote transceiver 220 will be described from the perspective of transceiver 215. Thus, an optical transmit signal is a signal propagating from transceiver 215 to remote transceiver 220 (e.g., optical transmit signal 230). An optical receive signal is a signal propagating from remote transceiver 220 to transceiver 215 (e.g., optical receive signal 235). However, it should be appreciated that remote transceiver 220 could be identical to transceiver 215 and the present discussion is equally applicable from the perspective of remote transceiver 220.

In one embodiment, communication link 205 is a single mode optical fiber. However, other waveguide devices may be used and communication link 205 may even be a free space optical link. Thus, in one embodiment, communication link 205 is a single optical fiber supporting optical transmit signals and optical receive signals counter propagating therein.

Transceiver 215 (and remote transceiver 220) may be either half-duplex or full-duplex. Furthermore, optical transmit signal 230 generated by transceiver 215 may have a communication wavelength $\lambda_{C1}$ substantially different than communication wavelength $\lambda_{C2}$ of optical receive signal 235. Alternatively, the present invention includes embodiments where communication wavelength $\lambda_{C1}$ is substantially equivalent to communication wavelength $\lambda_{C2}$. Thus, optical transmit signal 230 and optical receive signal 235 may counter propagate along the same communication link 205 (either concurrently or in alternating fashion) and operate using the same carrier wavelength.

Embodiments of the present invention are well suited for communication link 205 covering a span of 100 m to 10 km in length and supporting bandwidths 10 to 40 Gbits/sec. However, embodiments of the present invention are not limited to these spans or bandwidths; but rather, may be implemented in connection with shorter or longer spans and lesser or greater bandwidths.

Figure 3:
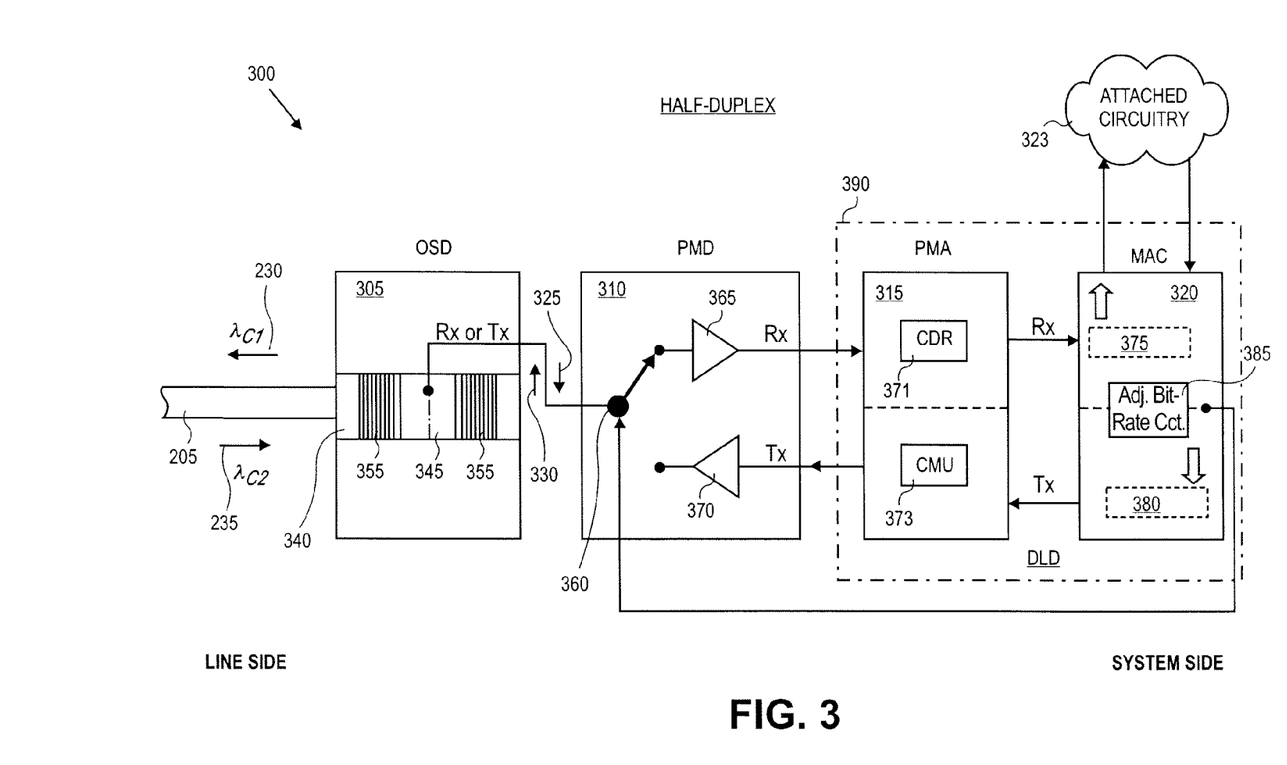
FIG. 3 is a block diagram illustrating a half-duplex transceiver for implementing bi-directional communications over a single communication link, in accordance with an embodiment of the present invention.

FIG. 3 is a diagram illustrating a half-duplex transceiver 300 for implementing bi-directional communications over communication link 205, in accordance with an embodiment of the present invention. Half-duplex transceiver 300 illustrates one embodiment of transceiver 215 illustrated in FIG. 2. The illustrated embodiment of half-duplex transceiver 300 includes an optical semiconductor device ("OSD") 305, a physical media driver ("PMD") 310, a physical media access ("PMA") device 315, and a media access controller ("MAC") 320.

The elements of half-duplex transceiver 300 are interconnected as follows. OSD 305 acts to receive optical receive signal 235 and to generate electrical receive signal 325 in response. OSD 305 further acts to receive an electrical transmit signal 330 and generate optical transmit signal 230 in response. OSD 305 includes an integral waveguide 340 having a diode 345 formed therein. In one embodiment, integral waveguide 340 is a planar waveguide, though other waveguides may be used, such as a rib waveguide and the like. Integral waveguide 340 is optically coupled to communication link 205 such that optical transmit signal 230 may be launched into communication link 205 and optical receive signal 235 may be coupled into integral waveguide 340 for interaction with diode 345 (described below). In one embodiment, integral waveguide 340 is edge coupled to communication link 205 (e.g., planar surfaces are butted together). In one embodiment, integral waveguide 340 and diode 345 form a vertical cavity surface emitting laser ("VCSEL"). In one embodiment, diode 345 is a P-I-N diode.

OSD 305 may optionally include a grating(s) 355 to form a resonant cavity around diode 345 to encourage stimulated emission from diode 345 at communication wavelengths $\lambda_{C1}$ or $\lambda_{C2}$. In one embodiment, grating(s) 355 is a distributed feedback ("DFB") grating formed adjacent to or on the surface of integral waveguide 340. In one embodiment, grating(s) 355 are distributed Bragg reflectors ("DBRs") formed within integral waveguide 340 on either side of diode 345. In an embodiment where $\lambda_{C1}=\lambda_{C2}$, grating(s) 355 may be a static grating. In an embodiment where $\lambda_{C1} \neq \lambda_{C2}$, grating(s) 355 may be a dynamic grating having a Bragg condition that varies according to a voltage potential applied across grating(s) 355. In an embodiment where grating(s) 355 are DBRs and $\lambda_{C1} \neq \lambda_{C2}$, the DBRs may have a static Bragg condition at the communication wavelength $\lambda_{C1}$ to encourage resonance at communication wavelength $\lambda_{C1}$, but allow transmission of optical receive signal 235 at communication wavelength $\lambda_{C2}$.

OSD 305 may be monolithically fabricated on a single semiconductor wafer. For example, OSD 305 may be defined on a gallium arsenide (GaAs) wafer or an indium phosphate (InP) wafer. Other known or after developed semiconductor materials may be used within the scope and spirit of the present invention.

It should be appreciated that the materials and dimensions utilized to describe embodiments discussed in connection with FIGS. 2 and 3 are provided for explanation purposes only and that other materials and dimensions may be utilized in accordance with the teachings of the present invention. The relative size, shape, and distances between the elements of the various embodiments of the present invention are in some instances exaggerated for clarity and are not necessarily shown to scale. Furthermore, for the sake of clarity, certain elements have been excluded from the discussion and figures. For example, embodiments of transceiver 300 may further include coupling optics, such as a focusing lens, a collimating lens, and/or mode conversion lens, as are known in the art, to optically couple communication link 205 to integral waveguide 340. Furthermore, embodiments of integral waveguide 340 may further include a beam expansion section to facilitate optical coupling between integral waveguide 340 and communication link 205 (e.g., optical fiber).

PMD 310 acts to switchably connect OSD 305 to one of a receive amplifier and a signal driver dependent upon whether half-duplex transceiver 300 is currently operating in a transmit mode (e.g., during a transmit interval) or a receive mode (e.g., during a receive interval). PMD 310 includes a switch 360, a receive amplifier 365, and a signal driver 370. Switch 360 is electrically coupled to diode 345 via an electrical interface. In one embodiment, the electrical interface is a single bonding wire. Switch 360 may be controlled by MAC 320, as illustrated. Typically, switch 360 may be implemented using a transistor switch. In one embodiment, receive amplifier 365 is a trans-impedance amplifier ("TIA") configured to convert electrical receive signal 325 from an input current to an output voltage. In one embodiment, signal driver 370 is a current driver.

PMA device 315 acts to clock and/or phase lock electrical receive signal 325 and electrical transmit signal 330. PMA device 315 may include a clock data recovery ("CDR") circuit 371 and may optionally include a clock multiplier unit ("CMU") 373 when MAC 320 is operating at a slower clock rate than the line rate of communication link 205. In one embodiment, half-duplex transceiver 300 runs at the same bit-rate during both the transmit interval and the receive interval. In this embodiment, CDR circuit 371 need only act as a phase detector to lock to a clock signal having a known frequency, which may be imbedded within electrical receive signal 325. In an alternative embodiment, half-duplex transceiver 300 is capable of transmitting data at varying bit-rates and therefore receiving data at varying bit-rates. In this alternative embodiment, CDR circuit 371 includes a fast locking phase lock loop ("PLL") capable of locking onto a range of frequencies. At high bit-rates (e.g., 10 Gbits/s) it is important that CDR circuit 371 can quickly acquire a lock onto clock data embedded within electrical receive signal 325, else the high bit-rate is wasted, resulting in a decrease of effective throughput.

MAC 320 acts to buffer transmit and receive data, as well as, monitor and prevent buffer overruns, arbitrate between the transmit mode and the receive mode, negotiate bit-rates, and provide feedback to higher-level protocols executing on attached circuitry 323. MAC 320 includes a receive buffer 375, a transmit buffer 380, and an adjustable bit-rate circuit ("ABRC") 385. Receive buffer 375 temporarily stores data extracted from electrical receive signal 325 until attached circuitry 323 is ready to receive the data. Similarly, transmit buffer 380 temporarily stores data to be encoded/modulated into electrical transmit signal 330.

ABRC 385 determines and adjusts the bit-rate to transmit data over communication link 205. ABRC 385 may transmit at a bit-rate that is set via a software interface executing on attached circuitry 323, at a bit-rate that is preset according to the length and quality of communication link 205 at the time of installation, or may scale in real-time depending upon current link conditions. In the latter embodiment, ABRC 385 scales the bit-rate to achieve maximum data throughput while maintaining link integrity with a remote transceiver (e.g., remote transceiver 220). Thus, dependent upon the current conditions affecting the quality of communication link 205, ABRC 385 is capable of contemporaneously scaling the bit-rate to achieve optimal data throughput. Furthermore, ABRC 385 can leverage a trade-off between bit-rate and the length of communication link 205 (e.g., fiber span). At long spans or high attenuation (due to mishandled fiber, dirty connectors, etc.) the bit-rate of half-duplex transceiver 300 can be lowered to maintain link integrity. At shorter spans of communication link 205, the bit-rate can be increased to the maximum possible. In one embodiment, ABRC 385 increases the bit-rate until errors are detected in the data and then slightly backs off. ABRC 385 can continually execute this process through a communication session to ensure maximum data throughput is always achieved.

In one embodiment, variable/adaptable bit-rates can be achieved via cooperation between MAC 320 and PMA device 315. ABRC 385 controls the frequency at which electrical transmit signal 330 and optical transmit signal 230 are driven. ABRC 385 provides CMU 373 with a clock signal, which CMU 373 up multiplies to an in-phase clock frequency (e.g., 10 GHz). In one embodiment, ABRC 385 includes a voltage control oscillator ("VCO") capable of generating a plurality of different clock frequencies for CMU 373. For example, ABRC 385 could include banks of varactors or multiple VCOs. In an alternative embodiment, ABRC 385 includes a single VCO generating a constant frequency to clock the modulation of electrical transmit signal 330. In this alternative embodiment, the effective bit-rate is varied via duplicated/repeated bit transfers. As an example, transmitting each bit twice halves the bit-rate and increases the probability of valid data reception at a remote transceiver.

As mentioned above, embodiments of MAC 320 are capable of arbitrating between the transmit mode and receive mode of transceiver 300. By indicating to switch 360 to switch between receive amplifier 365 and signal driver 370, MAC 320 controls whether transceiver 300 operates in the receive mode or the transmit mode. However, MAC 320 is further capable of providing asymmetric bandwidth for each of the transmit and receive modes. Usually, download bandwidths are much higher than upload bandwidths (e.g., xDSL modems). Thus, MAC 320 can adjust a length of the transmit interval and/or a length of the receive interval to provide greater receive bandwidth. In one embodiment, MAC 320 can adjust the length of the transmit interval and the receive interval in real-time based on current bandwidth demands.

PMD 310, PMA device 315, and MAC 320 may be fabricated in silicon using known techniques. Furthermore, the functionalities of PMA device 315 and MAC 320 may be integrated into a single device, referred to as a data link device ("DLD") 390. Thus, in an embodiment where the functionalities of PMA device 315 and MAC 320 are commingled into DLD 390, the subcomponents of each device may also be commingled and need not be discrete blocks as illustrated. Henceforward, reference to DLD 390 may be used to refer to PMA device 315 and MAC 320 as discrete elements or as commingled elements. In one embodiment, DLD 390 includes hardware to implement various layers of the Open System Interconnect ("OSI") standard promulgated by the International Organization for Standardization ("ISO"). Additionally, one or more of, PMD 310, PMA device 315, and MAC 320 may be integrated onto a single semiconductor wafer for specialty applications and/or to reduce the cost of fabrication.

Figure 4A:
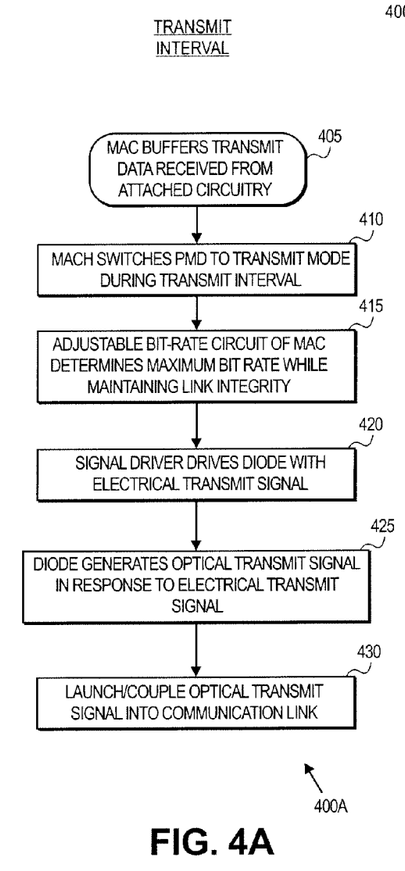
FIG. 4A is a flow chart illustrating a process a half-duplex transceiver executes to launch/couple an optical transmit signal into a communication link, in accordance with an embodiment of the present invention.
Figure 4B:
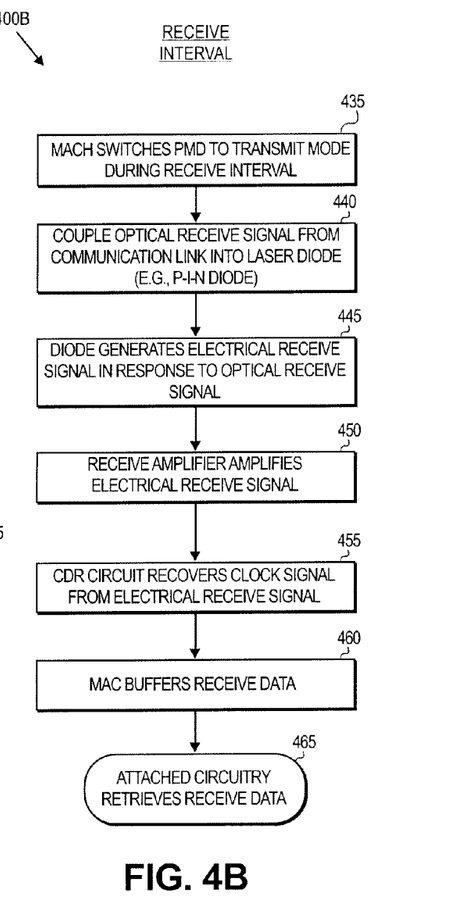
FIG. 4B is a flow chart illustrating a process a half-duplex transceiver executes to receive an optical receive signal from a communication link, in accordance with an embodiment of the present invention.

Turning now to FIGS. 4A and 4B, the operation of transceiver 300 is described. FIG. 4A is a flow chart illustrating a process 400A executed by half-duplex transceiver 300 during the transmit interval to launch/couple optical transmit signal 230 into communication link 205, in accordance with an embodiment of the present invention.

In a process block 405, MAC 320 (or DLD 390) buffers transmit data received from attached circuitry 323 in transmit buffer 380. In a process block 410, MAC 320 switches PMD 310 to the transmit mode, indicating to PMD 310 to electrically couple signal driver 370 to OSD 305 via appropriately switching switch 360.

In a process block 415, ABRC 385 determines the maximum bit-rate communication link 205 is capable of supporting while maintaining link integrity between half-duplex transceiver 300 and a remote transceiver (e.g., remote transceiver 220). As discussed above, there are a number of different techniques ABRC 385 can perform to determine the maximum bit-rate, any of which may be implemented. Furthermore, process block 415 may be executed continuously by ABRC 385 during process 400A.

In a process block 420, signal driver 370 drives current through diode 345 via the electrical connection provided by switch 360. Current driven by signal driver 370 is electrical transmit signal 330. Signal driver 370 amplifies the electrical transmit signal received from PMA device 315, which in turn was modulated with the transmit data buffered in buffer 380 and optionally up multiplied in frequency by CMU 373.

In a process block 425, electrical transmit signal 330 is driven through diode 345 causing diode 345 to emit optical transmit signal 230, in response. In one embodiment, diode 345 is forward biased during the transmit interval. Forward biasing diode 345 causes diode 345 to act as a laser diode, which can be directly modulated with the transmit data from transmit buffer 380 via application of electrical transmit signal 330 across diode 345. Finally, in a process block 430, optical transmit signal 230 is launched/coupled into communication link 205 from integral waveguide 340. Communication link 205 guides optical transmit signal 230 to a remote transceiver (e.g., remote transceiver 220) for reception and demodulation.

FIG. 4B is a flow chart illustrating a process 400B executed by half-duplex transceiver 300 during the receive interval to receive optical receive signal 235 from communication link 205, in accordance with an embodiment of the present invention. In a process block 435, MAC 320 (or DLD 390) switches PMD 310 to the receive mode by indicating to PMD 310 to electrically couple receive amplifier 365 to OSD 305 via appropriately switching switch 360.

In a process block 440, optical receive signal 235 is coupled from communication link 205 into integral waveguide 340. Within integral waveguide 340, optical receive signal 235 is guided to interact with diode 345. In one embodiment, diode 345 is reversed biased during the receive interval and thereby acts as a P-I-N photodiode. When optical receive signal 235 interacts with diode 345, photo current is generated resulting in electrical receive signal 325 (process block 445).

In a process block 450, electrical receive signal 325 is directed to receive amplifier 365 via switch 360. Receive amplifier 365 amplifies electrical receive signal 325 for demodulation by PMA device 315. In one embodiment, receive amplifier 365 is a TIA. In the TIA embodiment, in addition to amplifying electrical receive signal 325, receive amplifier 365 converts electrical receive signal 325 from a current signal to a voltage signal.

In a process block 455, CDR circuit 370 recovers a clock signal from electrical receive signal 325 allowing PMA device 315 to demodulate electrical receive signal 325 and extract the receive data modulated therein. In a process block 460, the receive data is temporarily stored in receive buffer 375 by MAC 320. Finally, attached circuitry 323 retrieves the receive data, allowing receive buffer 375 to be recycled (process block 465).

As discussed above, half-duplex transceiver 300 alternates back and forth between the transmit interval and the receive interval, repeating processes 400A and 400B each time. MAC 320 determines when to alternate between the transmit interval (transmit mode) and the receive interval (receive mode) according to the current download and upload bandwidth demands, to ensure receive buffer 375 and transmit buffer 380 are timely recycled to prevent a buffer overrun, and to maintain a short communication latency with remote transceiver 220.

Figure 5:
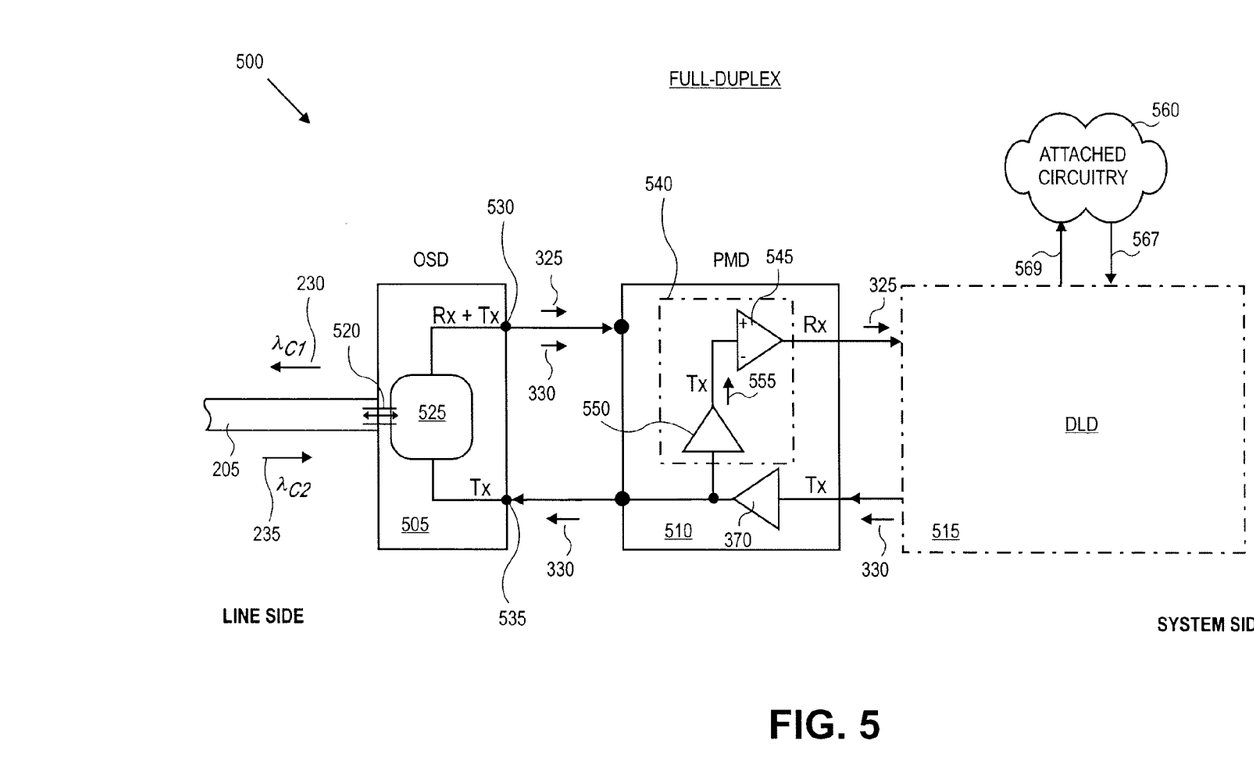
FIG. 5 is a block diagram illustrating a full-duplex transceiver for implementing bi-directional communications over a single communication link, in accordance with an embodiment of the present invention.

FIG. 5 is a diagram illustrating a full-duplex transceiver 500 for implementing bi-directional communications over a single communication link 205, in accordance with the teachings of the present invention. Full-duplex transceiver 500 illustrates one embodiment of transceiver 215 illustrated in FIG. 2. The illustrated embodiment of full-duplex transceiver 500 includes an OSD 505, PMD 510, and a DLD 515. In contrast to half-duplex transceiver 300 discussed above, full-duplex transceiver 500 is capable of simultaneously transmitting optical transmit signal 230 and receiving optical receive signal 235 to/from communication link 205 (e.g., a single optical fiber).

The elements of full-duplex transceiver 500 are interconnected as follows. OSD 505 acts to receive optical receive signal 235 and to generate electrical receive signal 325 in response. OSD 305 further acts to receive an electrical transmit signal 330 and to generate optical transmit signal 230 in response. OSD 505 includes a bi-directional optical port 520, an electro-optical conversion element 525, an electrical receive port 530, and an electrical transmit port 535. Bi-directional optical port 520 is optically coupled to electro-optical conversion element 525 and to be optically coupled to communication link 205 when physically installed for use in the field. In one embodiment, bi-directional optical port 520 is optically coupled to communication link 205 using similar techniques as used to couple integral waveguide 340 to communication link 205 in half-duplex transceiver 300 (FIG. 3). Electro-conversion element 525 is further electrically coupled to electrical receive port 530 and electrical transmit port 535.

PMD 510 acts to amplify electrical transmit signal 330 received from DLD 515 and to amplify electrical received signal 325 received from OSD 505. PMD 510 further acts to isolate electrical received signal 325 from electrical transmit signal 330. The illustrated embodiment of PMD 510 includes a signal driver 370 and an echo cancellation circuit 540. The illustrated embodiment of echo cancellation circuit 540 includes a receive amplifier 545 and a phase and amplitude compensator circuit ("PACC") 550.

Signal driver 370 is electrically coupled to an output of DLD 515 to receive electrical transmit signal 330 therefrom and amplify it. Signal driver 370 is further electrically coupled to electrical transmit port 535 of OSD 505 for driving electro-optical conversion element 525 with the amplified electrical transmit signal 330. Signal driver 370 is further electrically coupled to an input of PACC 550. A non-inverting input of receive amplifier 545 is electrically coupled to electrical receive port 530 of OSD 505 and an inverting input of receive amplifier 545 is electrically coupled to an output of PACC 550. An output of receive amplifier 545 is electrically coupled to an input of DLD 515 to provide an isolated and amplified copy of electrical receive signal 325 thereto.

Due to the simultaneous send and receive (i.e., upload and download) operation of full-duplex transceiver 500, OSD 505 concurrently outputs both electrical receive signal 325 and an echo of electrical transmit signal 330 on electrical receive port 530. Therefore, echo cancellation circuit 540 acts to isolate electrical receive signal 325 by subtracting out electrical transmit signal 330. The illustrated embodiment of echo cancellation circuit 540 achieves this isolation by configuring receive amplifier 545 to amplify differential signals between its inputs, while at the same time suppressing common-mode signals between its inputs. Thus, in one embodiment, receive amplifier 545 is a differential gain amplifier. In one embodiment, receive amplifier 545 is a TIA amplifier having a differential gain configuration.

However, electrical transmit signal 330 received at the non-inverting input of receive amplifier 545 is not identical to electrical transmit signal 330 output by signal driver 370. Rather, the electrical transmit signal 330 output by electrical receive port 530 is phase delayed and amplitude adjusted by electro-optical conversion element 525. Thus, PACC 550 acts to compensate for the phase delay and the amplitude adjustment induced by electro-optical conversion element 525 and the electrical interconnects between the output of signal driver 370 and the non-inverting input of receive amplifier 545. In general, the phase delay induced to electrical transmit signal 330 received at the non-inverting input of receive amplifier 545 is a constant phase delay during operation. Thus, in one embodiment, PACC 550 is tuned once during an initial setup (e.g., at the factory, during in-field installation, or simply by design) to apply the appropriate phase delay to electrical transmit signal 330. Conversely, typically the amplitude adjustment induced to electrical transmit signal 330 by electro-optical conversion element 525 (and the interconnects) is not constant during operation. Therefore, in one embodiment, PACC 550 continually adjusts the amplitude of compensated transmit signal 555 in real-time.

It should be appreciated that the illustrated embodiment of echo cancellation circuit 540 is only one possible embodiment. Those of ordinary skill in the art having the benefit of the present invention will understand that other known echo cancellation circuits may be employed to isolate electrical receive signal 325 from electrical transmit signal 330.

DLD 515 acts to modulate data received from attached circuitry 560 into electrical transmit signal 330 and to demodulate data imbedded in electrical receive signal 325 to be passed to attached circuitry 560. DLD 515 may further act to buffer send and receive data and to clock the send and receive bit-rates. In one embodiment, DLD 515 includes hardware to implement various layers of the OSI standard promulgated by the ISO. In the illustrated embodiment, DLD 515 is electrically coupled to PMD 510 with two electrical interconnects, one for receiving electrical receive signal 325 and one for transmitting electrical transmit signal 330.

Figure 6A:
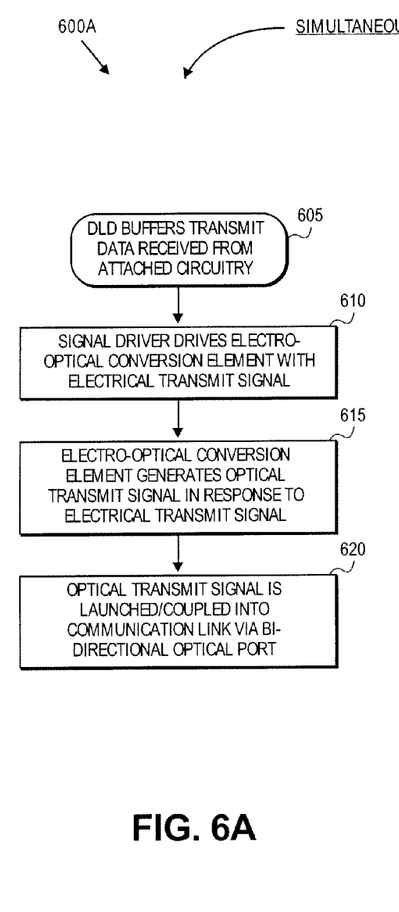
FIG. 6A is a flow chart illustrating a process a full-duplex transceiver executes to launch/couple an optical transmit signal into a communication link, in accordance with an embodiment of the present invention.
Figure 6B:
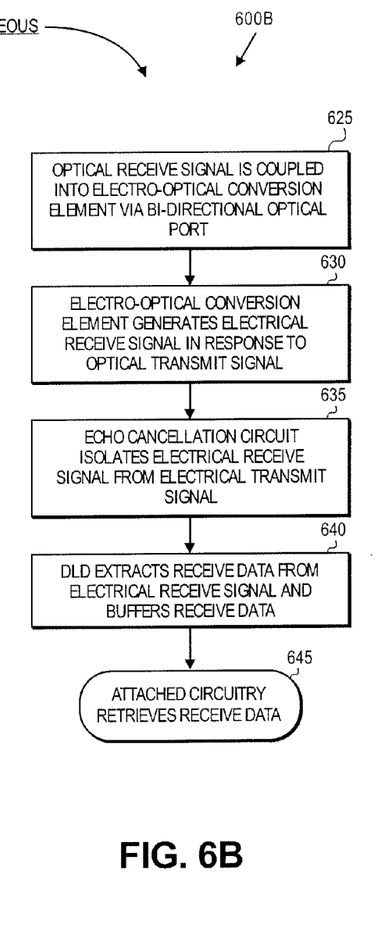
FIG. 6B is a flow chart illustrating a process a full-duplex transceiver executes to receive an optical receive signal from a communication link, in accordance with an embodiment of the present invention.

Turning now to FIGS. 6A and 6B, the operation of full-duplex transceiver 500 is described. FIG. 6A is a flow chart illustrating a process 600A executed by full-duplex transceiver 500 to launch/couple optical transmit signal 230 into the single communication link 205 (i.e., upload direction), in accordance with an embodiment of the present invention.

In a process block 605, DLD 515 temporarily buffers transmit data 567 received from attached circuitry 560. Once buffered, DLD 515 modulates the transmit data 567 into electrical transmit signal 330 to be provided to PMD 510 for amplification. In a process block 610, signal driver 370 drives electro-optical conversion element 525 with electrical transmit signal 330. In a process block 615, electro-optical conversion element 525 emits optical transmit signal 230 in response to electrical transmit signal 330. Finally, optical transmit signal 230 is launched/coupled into communication link 205 via bi-directional optical port 520.

FIG. 6B is a flow chart illustrating a process 600B executed by full-duplex transceiver 500 to receive optical receive signal 235 from the single communication link 205 (i.e., download direction), in accordance with an embodiment of the present invention. In a process block 625, optical receive signal 235 is coupled into electro-optical conversion element 525 via bi-directional optical port 520. In a process block 630, optical receive signal 235 interacts with electro-optical conversion element 525, causing electro-optical conversion element 525 to generate electrical receive signal 325 in the form of photocurrent. Thus, electro-optical conversion element 525 outputs electrical receive signal 325 on electrical receive port 530, but also simultaneously outputs electrical transmit signal 535 on electrical receive port 530, for reasons discussed below. In a process block 635, echo cancellation circuit 540 isolates electrical receive signal 325 from electrical transmit signal 330 and outputs an amplified copy of electrical receive signal 325 to DLD 515. In a process block 640, DLD 515 extracts receive data from the electrical receive signal 325 and buffers the receive data for attached circuitry 560. In a process block 645, attached circuitry 560 retrieves the receive data.

It should be appreciated that processes 400A, 400B, 600A, and 600B are intended for illustration and explanation only. Those of ordinary skill in the art having the benefit of the present disclosure will recognize that the order of some of the process blocks may be rearranged from that illustrated without deviating from the spirit of the present invention.

Figure 7A:
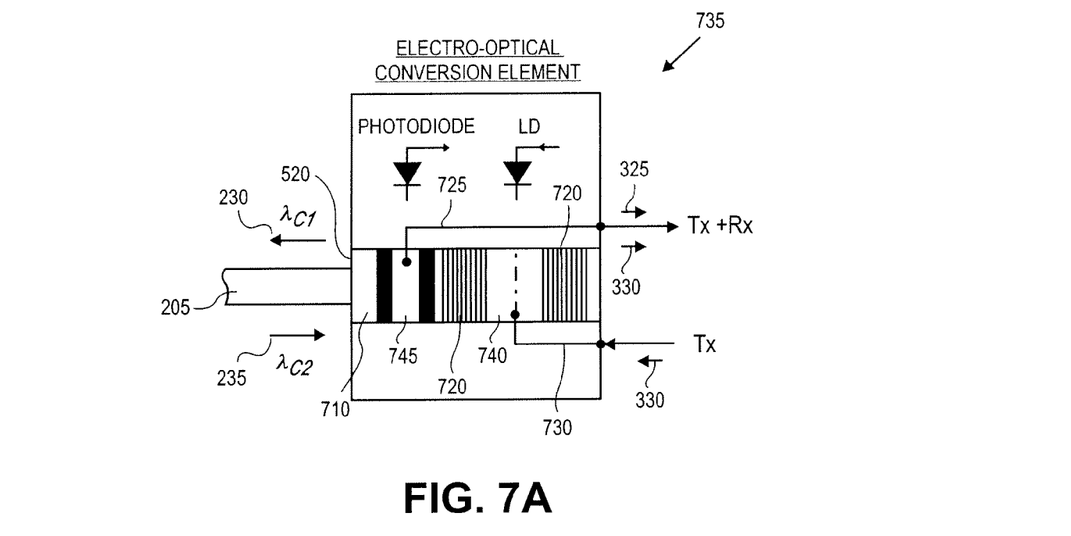
FIG. 7A is a diagram illustrating an electro-optical conversion element for receiving an optical receive signal and generating an electrical receive signal in response and for receiving an electrical transmit signal and generating an optical transmit signal in response, in accordance with an embodiment of the present invention.

FIG. 7A is a diagram illustrating an electro-optical conversion element 735, in accordance with an embodiment of the present invention. Electro-optical conversion element 735 is one embodiment of electro-optical conversion element 525 (FIG. 5). The illustrated embodiment of electro-optical conversion element 735 includes an integral waveguide 710, a laser diode ("LD") 740, a photodiode 745, optional grating(s) 720, and electrical interconnects 725 and 730.

In the illustrated embodiment, LD 740 and photodiode 745 are formed within integral waveguide 710. In one embodiment, photodiode 745 is a P-I-N diode configured as a photo detector. Optical transmit signal 230 and optical receive signal 235 are coupled through bi-directional optical port 520 to propagate back-and-forth between communication link 205 and integral waveguide 710. Integral waveguide 710 guides optical transmit signal 230 and optical receive signal 235 to/from photodiode 745 and LD 740. Electrical interconnect 725 couples photodiode 745 to electrical receive port 530. Electrical interconnect 730 couples LD 740 to electrical transmit port 535. In one embodiment, granting(s) 720 are similar to grating(s) 355, described above.

During operation, optical receive signal 235 is coupled into integral waveguide 710 and guided to interact with photodiode 745. A portion (e.g., one half) of the optical energy of optical receive signal 235 is absorbed by photodiode 745 causing the generation of electrical receive signal 325 as photocurrent. This photocurrent (i.e., electrical receive signal 325) is coupled to electrical receive port 530 via electrical interconnect 725. During operation, LD 740 generates optical transmit signal 230 when electrical transmit signal 330 is driven across LD 740 via electrical interconnect 730. Once generated, optical transmit signal 230 propagates along integral waveguide 710, through photodiode 745 and launched into communication link 205. Therefore, a portion (e.g., one half) of the optical energy of optical transmit signal 230 is also absorbed by photodiode 745, resulting in generation of electrical transmit signal 330 along electrical interconnect 725, as well. Electro-optical conversion element 735 is capable of full-duplex operation, and thus, at any given time LD 740 may be simultaneously generating optical transmit signal 230 while photodiode 745 is receiving optical receive signal 235. Therefore, the photocurrent generated by photodiode 745 at any given time is a result of optical energy absorbed from both optical transmit signal 230 and optical receive signal 235. Thus, electrical interconnect 725 conducts both electrical receive signal 325, as well as, electrical transmit signal 330.

Figure 7B:
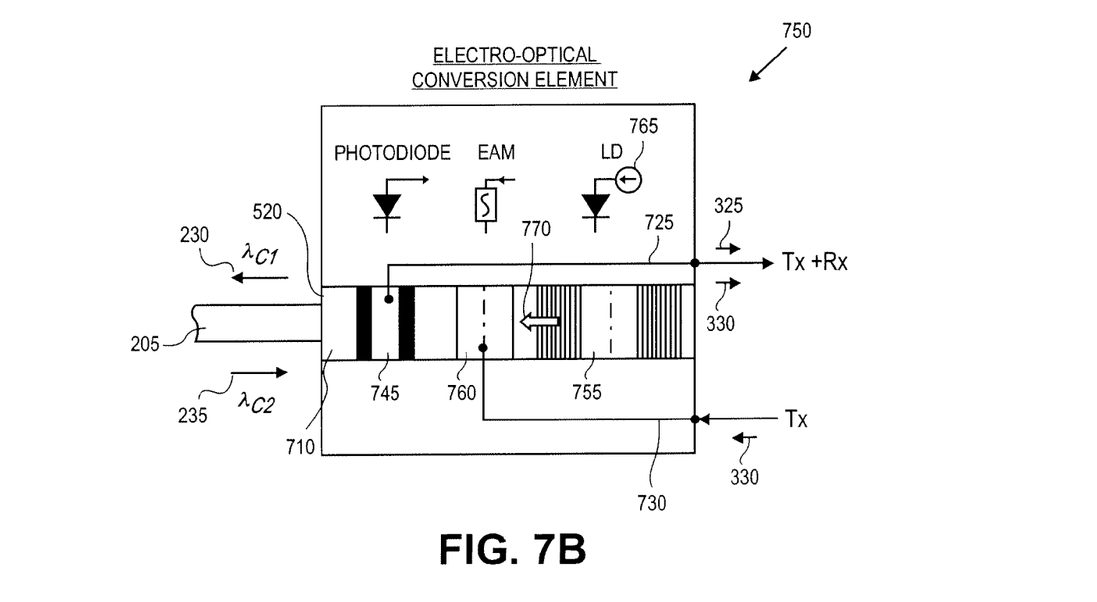
FIG. 7B is a diagram illustrating an electro-optical conversion element for receiving an optical receive signal and generating an electrical receive signal in response and for receiving an electrical transmit signal and generating an optical transmit signal in response, in accordance with an embodiment of the present invention.

FIG. 7B is a diagram illustrating an electro-optical conversion element 750, in accordance with an embodiment of the present invention. Electro-optical conversion element 750 is one embodiment of electro-optical conversion element 525 (FIG. 5). The illustrated embodiment of electro-optical conversion element 750 includes integral waveguide 710, LD 755, an electro-absorption modulator ("EAM") 760, photodiode 745, optional grating(s) 720, and electrical interconnects 725 and 730.

Electro-optical conversion element 750 is similar to electro-optical conversion element 735 with the following exceptions. Instead of directly modulating LD 740 as in the case of electro-optical conversion element 735, LD 755 is driven by a constant current source 765. Constant current source 765 causes LD 755 to generate a continuous wave beam 770 propagating along integral waveguide 710 towards bi-directional optical port 520. EAM 760 is formed within integral waveguide 710 between photodiode 745 and LD 765. EAM 760 may include a diode configured as an electro-absorption modulator or the like. Furthermore, electrical interconnect 730 is coupled to EAM 760 to modulate the optical absorption properties of EAM 760. EAM 760 is modulated with electrical transmit signal 330 conducted along electrical interconnect 730. Once modulated, continuous wave ("CW") beam 770 emerges from EAM 760 as optical transmit signal 230, which passes through photodiode 745 and is launched into communication link 205.

During download operation, which may be simultaneous to the upload operation described above, electro-optical conversion element 750 receives optical receive signal 235 from communication link 205. Optical receive signal 235 is guided by integral waveguide 710 to interact with photodiode 745 to generate electrical receive signal 325 as photocurrent. Since optical power from both optical transmit signal 230 and optical receive signal 235 may be absorbed by photodiode 745 at any given time, electrical interconnect 725 carries both electrical receive signal 325 and electrical transmit signal 330.

An example power link budget for electro-optical conversion element 750 may be as follows: LD 765 outputs CW beam 770 having 0 dBm, EAM 760 outputs optical transmit signal 330 having −3 dBm on average, optical transmit signal 330 launched into communication link 205 having −8 dBm (approximately 3 dB of optical transmit signal 330 is absorbed in photodiode 745 and 2 dB lost due to coupling between communication link 205 and bi-directional optical port 520), remote transceiver 220 receives optical transmit signal having −15 dBm (2 dB per 10 km of optical fiber, 3 dB for connectors and aging, 2 dB for coupling into remote transceiver 220), optical transmit signal 230 collides with EAM 760 in remote transceiver 220 having −18 dBm (3 dB absorbed in photodiode 745 of remote transceiver 220). Optical transmit signal 230 received at remote transceiver 220 corresponds to optical receive signal 235 received at full-duplex transceiver 500. Therefore, the power of optical receive signal 235 disturbing EAM 760 is 15 dB below the output power of optical transmit signal 230 from EAM 760. Thus, optical receive signal 235 should cause insignificant dynamic changes in the absorption properties of EAM 760.

Figure 8:
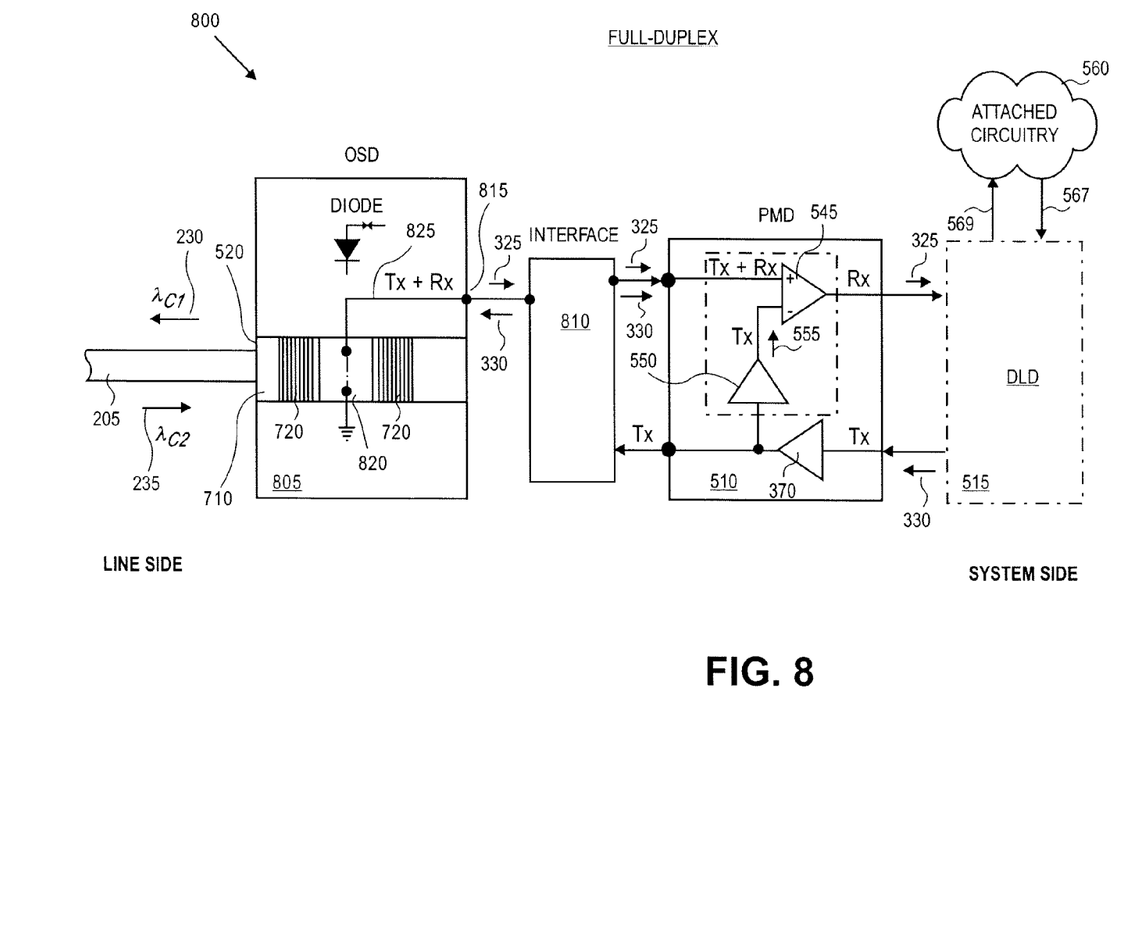
FIG. 8 is a block diagram illustrating a full-duplex transceiver for implementing bi-directional communications over a single communication link, in accordance with an embodiment of the present invention.

FIG. 8 is a diagram illustrating a full-duplex transceiver 800 for implementing bi-directional communications over a single communication link 205, in accordance with the teachings of the present invention. Full-duplex transceiver 800 illustrates one embodiment of transceiver 215 illustrated in FIG. 2. The illustrated embodiment of full-duplex transceiver 800 includes an OSD 805, an interface 810, PMD 510, and a DLD 515.

Transceiver 800 is similar to transceiver 500 with the following exceptions. Transceiver 800 includes interface 810 coupled between OSD 805 and PMD 510. Furthermore, OSD 805 includes only a single bi-directional electrical port 815, which is coupled to interface 810. Interface 810 electrically couples the non-inverting input of receive amplifier 545 and the output of signal driver 370 to bi-directional electrical port 815. In one embodiment, interface 810 is further capable of isolating electrical receive signal 325 from reaching the output of signal driver 370 and the input of PACC 550. In one embodiment, interface 810 is not external to PMD 510, but rather is a component of PMD 510.

The illustrated embodiment of OSD 805 includes integral waveguide 710, a diode 820, optional granting(s) 720, and an electrical interconnect 825. Diode 820 is formed within integral waveguide 710 to generate electrical receive signal 325 in response to optical receive signal 235 and to generate optical transmit signal 230 in response to electrical transmit signal 330. In one embodiment, diode 820 is a P-I-N diode. Integral waveguide 710 is optically coupled to communication link 205 via bi-directional optical port 520. Integral waveguide 710 guides optical transmit signal 230 and optical receive signal 235 to/from diode 820. Electrical interconnect 825 couples diode 820 to bi-directional electrical port 815.

Diode 820 generates optical transmit signal 230 when electrical transmit signal 330 is driven across diode 820 via electrical interconnect 825. Electrical interconnect 825 also couples photocurrent generated by diode 820 to bi-directional electrical port 815. Thus, diode 820 acts as both a laser diode and a photo detecting diode simultaneously. Electrical receive signal 325 is extracted as a perturbation current on electrical interconnect 825 via interface 810 by receive amplifier 545.

Half-duplex transceiver 300, full-duplex transceiver 500, and full-duplex transceiver 800 use a single communication link 205 (e.g., single optical fiber) to implement bi-directional communications between remote devices. Communication system 200 (FIG. 2) has obvious lower installation and maintenance costs than communication system 100. Furthermore, embodiments of the present invention benefit from low cost optics all contained in OSD 305, 505, and 805. This single optical module approach yields simple assembly procedures for both optical connection to communication link 205 and electrical connection to PMDs 310 and 510.

It should be appreciated that the relative size, shape, and distances between the elements illustrated in FIGS. 2, 3, 5, 7A, 7B, and 8 of the present invention are in some instances exaggerated for clarity and are not necessarily shown to scale. Furthermore, in some cases the drawings have been simplified or elements known to those of ordinary skill in the art excluded for the sake of clarity and so as not to detract from the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
generating an optical transmit signal in response to an electrical transmit signal;
coupling the optical transmit signal into a waveguide for transmission there over;
receiving an optical receive signal from the waveguide, the optical receive signal having a same communication wavelength as the optical transmit signal; and
generating an electrical receive signal in response to the received optical receive signal, wherein generating the optical transmit signal in response to the electrical transmit signal occurs simultaneously as generating the electrical receive signal in response to the received optical received signal.

2. The method of claim 1, further comprising adjusting a bit-rate of the electrical transmit signal and the optical transmit signal to maintain a link integrity across the optical waveguide with a remote transceiver at a maximum bit-rate.

3. The method of claim 1 wherein the optical transmit signal and the optical receive signal simultaneously propagate along the single optical waveguide in opposite directions.

4. The method of claim 3, further comprising isolating the electrical receive signal from the electrical transmit signal with an echo cancellation circuit.

5. The method of claim 3 wherein generating the optical transmit signal comprises directly modulating a diode and wherein receiving the optical receive signal comprises receiving the optical receive signal with the diode.

6. The method of claim 3 wherein generating the optical transmit signal comprises directly modulating a laser diode and wherein receiving the optical receive signal comprises receiving the optical receive signal with a P-I-N diode.

7. The method of claim 3 wherein generating the optical transmit signal comprises modulating a continuous wave beam with an electro-absorption modulator and wherein receiving the optical receive signal comprises receiving the optical receive signal with a P-I-N diode.

8. The method of claim 1 wherein the optical transmit signal is generated during a transmit interval and wherein the optical receive signal is received during a receive interval, the transmit interval and the receive interval alternating back and forth.

9. The method of claim 8, further comprising switchably coupling the electrical receive signal to a trans-impedance amplifier during the receive interval.

10. The method of claim 9, further comprising switchably coupling a signal driver to a diode during the transmit interval, the signal driver supplying the electrical transmit signal, the diode generating the optical transmit signal during the transmit interval.

11. The method of claim 10, further comprising forward biasing the diode during the transmit interval to generate the optical transmit signal and reverse biasing the diode during the receive interval to generate the electrical receive signal in response to the received optical receive signal.

12. The method of claim 8, further comprising transitioning between the receive interval and the transmit interval to maintain a short communication latency.

13. A half-duplex transceiver, comprising:
an optical semiconductor device ("OSD") to generate an optical transmit signal having a first wavelength for transmission along a communication link and to receive an optical receive signal having a second wavelength from the communication link, the OSD to generate the optical transmit signal in response to an electrical transmit signal and to generate an electrical receive signal in response to the optical receive signal, wherein the OSD includes a diode disposed within a waveguide and one of a distributed feedback grating or distributed Bragg reflectors disposed within the waveguide on either side of the diode;
a physical media driver ("PMD") electrically coupled to the OSD, the PMD to amplify the electrical receive signal during a receive mode and to drive the OSD with the electrical transmit signal during a transmit mode; and
a data link device ("DLD") electrically coupled to the PMD to switch the PMD between the receive mode and the transmit mode.

14. The half-duplex transceiver of claim 13 wherein the waveguide comprises an integral waveguide, and wherein the OSD comprises:
the integral waveguide for optically coupling to the communication link and to guide the optical receive signal and the optical transmit signal therein; and
the diode formed within the integral waveguide to generate the optical transmit signal in response to the electrical transmit signal and to generate the electrical receive signal in response to the optical receive signal.

15. The half-duplex transceiver of claim 13 wherein the diode comprises a P-I-N diode, the P-I-N diode to be forward biased during the transmit mode and to be reverse biased during the receive mode.

16. The half-duplex transceiver of claim 13 wherein the PMD comprises:
a receive amplifier to amplify the electrical receive signal during the receive mode;
a signal driver to drive the OSD with the electrical transmit signal during the transmit mode; and
a switch to switchably couple the OSD to the receive amplifier during the receive mode and to switchably couple the OSD to the signal driver during the transmit mode.

17. The half-duplex transceiver of claim 13 wherein the DLD comprises:
a physical media access ("PMA") device electrically coupled to the PMD to recover a clock signal from the amplified electrical receive signal and to clock the electrical transmit signal; and
a media access controller "MAC") electrically coupled to the PMA device and to the PMD to switch the PMD between the receive mode and the transmit mode and to buffer first data to transmit in the electrical transmit signal and to buffer second data received in the electrical receive signal.

18. The half-duplex transceiver of claim 13 wherein the first wavelength and the second wavelength are substantially equal.

19. The half-duplex transceiver of claim 13 wherein the DLD includes an adjustable bit-rate circuit ("ABRC") to adjust a bit-rate of the electrical transmit signal and the optical transmit signal during the transmit mode.

20. The half-duplex transceiver of claim 19 wherein the ABRC includes a variable voltage controlled oscillator.

21. An apparatus, comprising:
an optical semiconductor device ("OSD"), the OSD comprising:
an electro-optical conversion element to simultaneously convert an optical receive signal to an electrical receive signal and to convert an electrical transmit signal to an optical transmit signal;
a bi-directional optical port optically coupled to the electro-optical conversion element to simultaneously output the optical transmit signal and input the optical receive signal;
an electrical transmit port electrically coupled to the electro-optical conversion element to receive the electrical transmit signal; and
an electrical receive port electrically coupled to the electro-optical conversion element to output the electrical receive signal and the electrical transmit signal combined.

22. The apparatus of claim 21, further comprising a physical media device ("PMD"), the PMD comprising:
a transmit driver electrically coupled to the electrical transmit port of the OSD to drive the electro-optical conversion element with the electrical transmit signal; and
an echo cancellation circuit coupled to the electrical receive port of the OSD to isolate the electrical receive signal from the electrical transmit signal.

23. The apparatus of claim 21 wherein the electro-optical conversion element comprises:
an integral waveguide to optically couple to the bi-directional optical port and to guide the optical receive signal and the optical transmit signal therein;
a laser diode formed within the integral waveguide to generate the optical transmit signal in response to the electrical transmit signal; and
a P-I-N diode formed within the integral waveguide between the bi-directional optical port and the laser diode, the P-I-N diode positioned to receive the optical receive signal and to generate the electrical receive signal in response thereto.

24. The apparatus of claim 21 wherein the electro-optical conversion element comprises:
an integral waveguide to optically couple to the bi-directional optical port and to guide the optical receive signal and the optical transmit signal therein;
a laser diode formed within the integral waveguide to generate a constant wave optical beam along the integral waveguide;
an electro-optical absorption modulator ("EAM") formed within the integral waveguide between the bi-directional optical port and the laser diode, the EAM to modulate the constant wave optical beam in response to the electrical transmit signal; and
a P-I-N diode formed within the integral waveguide between the bi-directional optical port and the EAM, the P-I-N diode positioned to receive the optical receive signal and to generate the electrical receive signal in response thereto.

25. The apparatus of claim 21 wherein the electro-optical conversion element is coupled to convert the optical receive signal having a communication wavelength to the electrical receive signal and to convert the electrical transmit signal to the optical transmit signal having the same communication wavelength.

26. A communication system, comprising:
a first transceiver to convert an optical receive signal to an electrical receive signal and to convert an electrical transmit signal to an optical transmit signal, the optical receive signal having a same wavelength as the optical transmit signal;
a communication link optically coupled to the first transceiver to convey both the optical receive signal and the optical transmit signal, the first transceiver to launch the optical transmit signal into the communication link; and
a second transceiver optically coupled to the communication link, the second transceiver to generate the optical receive signal and to launch the optical receive signal into the communication link, the second transceiver to receive the optical transmit signal and to convert the optical transmit signal to a second electrical receive signal, wherein the first and second transceivers are configured to adjust a length of a transmit interval and to adjust a length of a receive interval to optimize data throughput across the communication link.

27. The communication system of claim 26 wherein the communication link comprises an optical fiber.

28. The communication system of claim 27 wherein the first and second transceivers are configured to launch the optical receive signal and the optical transmit signal into the optical fiber during mutually exclusive time intervals.

29. The communication system of claim 28 wherein the first and second transceivers each include an adjustable bit-rate circuit to adjust bit-rates of the optical receive signal and the optical transmit signal to maintain a link integrity across the optical fiber at a maximum bit-rate.

30. An apparatus, comprising:
an optical semiconductor device ("OSD"), the OSD comprising:
an integral waveguide to guide an optical receive signal and to guide an optical transmit signal therein;
a diode formed within the integral waveguide to generate the optical transmit signal in response to an electrical transmit signal and to generate an electrical receive signal in response to the optical receive signal;
one of a distributed feedback grating or distributed Bragg reflectors disposed within the integral waveguide on either side of the diode;
a bi-directional optical port optically coupled to the integral waveguide to simultaneously output the optical transmit signal and input the optical receive signal; and
a bi-directional electrical port electrically coupled to the diode to conduct the electrical transmit signal and the electrical receive signal.

31. The apparatus of claim 30, further comprising:
a transmit driver electrically coupled to drive the diode with the electrical transmit signal;
an echo cancellation circuit electrically coupled to isolate the electrical receive signal from the electrical transmit signal; and
an interface to electrically couple the hi-directional electrical port of the OSD to the transmit driver and to the echo cancellation circuit.

32. The apparatus of claim 31 wherein the echo cancellation circuit and the transmit driver are components of a physical media device ("PMD").

33. The apparatus of claim 30 wherein the diode is coupled to convert the optical receive signal having a communication wavelength to the electrical receive signal and to convert the electrical transmit signal to the optical transmit signal having the same communication wavelength.

34. A method, comprising:
generating an optical transmit signal in response to an electrical transmit signal;

coupling the optical transmit signal into a single communication link for transmission there over;
receiving an optical receive signal from the single communication link, the optical receive signal having a same communication wavelength as the optical transmit signal;
generating an electrical receive signal in response to the received optical receive signal; and adjusting a bit-rate of the electrical transmit signal and the optical transmit signal in real-time during operation based on current conditions of the single communication link to maintain a link integrity across the single communication link with a remote transceiver at a maximum bit-rate.

* * * * *

UNITED STATES PATENT AND TRADEMARK OFFICE
CERTIFICATE OF CORRECTION

PATENT NO. : 7,286,767 B2 Page 1 of 1
APPLICATION NO. : 10/674649
DATED : October 23, 2007
INVENTOR(S) : Franck et al.

It is certified that error appears in the above-identified patent and that said Letters Patent is hereby corrected as shown below:

Column 14, at line 48, before ""MAC")" insert --(--.
Column 16, at line 53, delete "hi" and insert --bi--.

Signed and Sealed this

Third Day of June, 2008

JON W. DUDAS
*Director of the United States Patent and Trademark Office*